G. CLARK.
PIPE FITTING.
APPLICATION FILED SEPT. 21, 1905.
924,039.
Patented June 8, 1909.
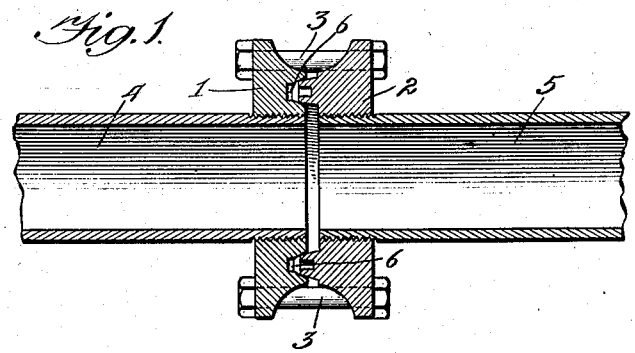
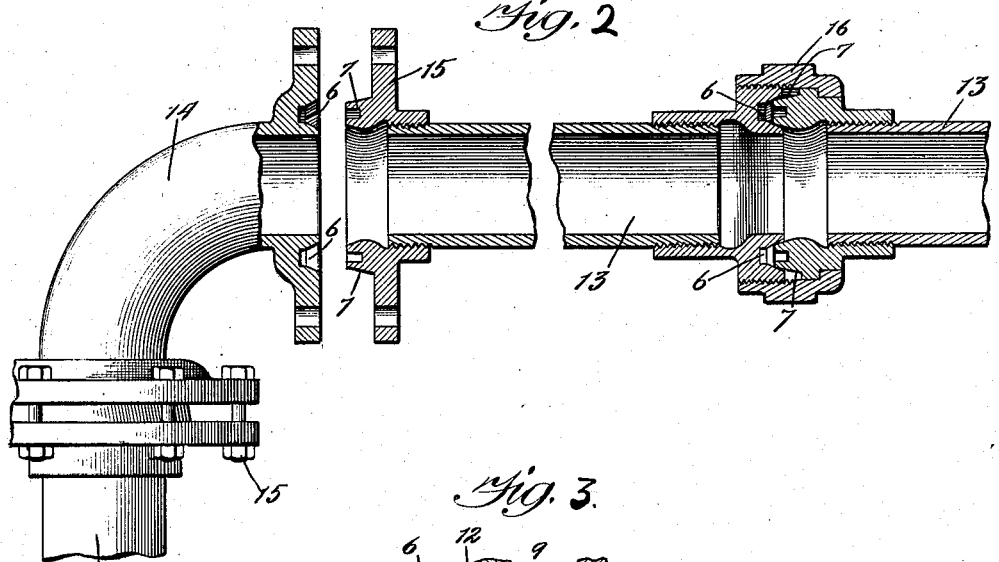
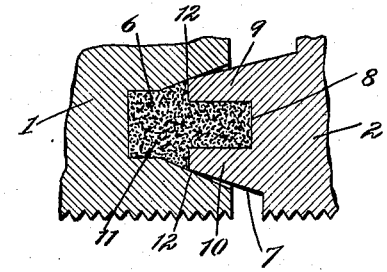
Witnesses:
JB Weir
Inventor:
George Clark
By
Atty.

UNITED STATES PATENT OFFICE.

GEORGE CLARK, OF CHICAGO, ILLINOIS, ASSIGNOR TO THE ECONOMIC SPECIALTY COMPANY, OF CHICAGO, ILLINOIS, A CORPORATION OF ILLINOIS.

PIPE-FITTING.

No. 924,039.          Specification of Letters Patent.          Patented June 8, 1909.

Application filed September 21, 1905. Serial No. 279,406.

*To all whom it may concern:*

Be it known that I, GEORGE CLARK, a citizen of the United States, and a resident of Chicago, in the county of Cook and State of Illinois, have invented certain new and useful Improvements in Pipe-Fittings, of which the following is a specification.

This invention relates to improvements in pipe fittings for high pressure work, and is designed to provide such an improved construction of the interfitting faces of devices of this character as will enable them to be made and remain tight without packing and by the metallic contact of the engaging parts.

The improvement is particularly designed for use in refrigerating systems, where the difficulty of keeping the joints tight against the tendency of the gas and liquor to escape under the intense pressure employed, is well known, but is equally applicable in all situations where high pressures, whether of steam, air, gas or other vapor or liquid are employed and with all kinds of fittings,—flanges, elbows, tees, box fittings, etc.

In said drawings,—Figure 1 is a longitudinal section of a pair of pipe flanges and connected pipes, embodying my improvement. Fig. 2 is a similar view of a line of piping, including an elbow and a box coupling, both embodying my improvements. Fig. 3 is an enlarged fragmentary detail, better showing the shape of the interfitting surfaces of the joint.

As shown in Figs. 1 and 2, 1 and 2 designate the two members of a pair of pipe flanges which are designed to be clamped together by bolts 3 so as to serve as a coupling for two lengths of pipe 4 and 5 which are screwed into the flanges. In accordance with the present improvement, the female member 1 is provided with an annular groove 6 arranged concentric with the screw threaded pipe opening in the center of the flange, while the male member 2 is provided with a projecting annular flange 7 arranged concentric with its screw threaded pipe opening, and adapted to fit into the groove 6 of the female member when the two members are drawn together by the clamping bolts 3. The groove 6 is made V-shaped or beveled and the flange 8 is likewise beveled so that it tends to be pinched within the groove when the clamping bolts are tightened. Said flange is furthermore itself provided with a groove 8 which, in effect, splits or divides it into inner or outer flanges 9 and 10 that yield slightly under the pinching action of the groove 6, with the result that the opposed metallic surfaces of the parts tend to conform exactly with each other, notwithstanding any slight imperfections or irregularities which might otherwise prevent the formation of a perfect joint. As a further improvement, also, it is contemplated that in the use of the improved joint thus described under very high pressures, such as would test the tightness of the joint to its uttermost, a viscous fluid or semi-fluid substance 11, such as a mixture of oil and graphite, will be introduced into the joint, not as a packing, but in order that when the clamping bolts 3 are tightened up the split flange 7 may be subjected to an interior hydraulic pressure tending to force apart the flanges 9 and 10, and cause their corners 12 to bear still more tightly against the sides of the groove 6. The amount of the fluid 11 retained within the groove 8 of the male part and the bottom of the groove 6 of the female part below the point where it is occupied by the male part, and the presence of this substance will not in the least interfere with the direct metallic contact of the parts at the corners 12, as described, but will simply tend to increase the intensity of the contact by reason of the hydraulic pressure to which the substance 11 will be subjected, due to the forcing of the male into the female part by the clamping bolts 3.

As before stated, this improved joint may be applied to any style of pipe fitting. For example, in Fig. 2, there is shown a fragmentary view of a line of piping 13, including an elbow 14, flange 15, and box fitting 16, all of the usual pattern, except in the construction of their engaging surfaces, which are designed in accordance with the present improvement and consist of interfitting male and female parts constructed as heretofore described in connection with Figs. 1 and 2. And no matter what the particular form of the fitting, or the nature of the installation in general, the operation of the joint will be substantially the same, that is to say, the tightening up of the clamping bolts 3 will cause the grooved male part to be pinched within the groove of the female part, assisted, if necessary, by the pressure of the inserted fluid or semi-fluid substance, which pressure is brought into operation by the very action of forcing the parts together, and which obviously tends to expand the grooved male part against the walls of the female part strongly but yieldingly, and in such manner as to cause the opposing surfaces of the parts to conform to each other, notwithstanding any slight irregularities which may exist between them. And in this connection it is important that the male part be beveled more sharply than the female part, so that the contact between them will occur at the extremities or outer corners 12 of the male part, so that the elasticity of the latter will be utilized to the uttermost.

With this construction, especially if the surfaces are tinned or coated with some soft metal, a joint may be easily made which, without any packing, will hold, without leakage, pressures running into the thousands of pounds per square inch, as, for example, the highest pressures known in high pressure refrigerating systems.

I claim as my invention:—

1. A pipe fitting, consisting of opposed male and female parts, and clamping means between said parts, the female part being provided with an annular groove and the male part with a grooved annular flange fitting into said groove and adapted to yieldingly enter the latter under the pressure of the clamping means, the outer corners only of the annular flange engaging the beveled walls of the groove substantially as described.

2. A pipe fitting, consisting of opposed male and female parts, and clamping means between said parts, the female part being provided with an outwardly flaring annular groove, and the male part with a grooved annular flange of beveled or tapering cross section, fitting into said groove and adapted to yieldingly enter the latter under the pressure of the clamping means, the outer corners only of the annular flange engaging the beveled walls of the groove substantially as described.

3. An improved pipe fitting, consisting of male and female parts, and clamping means between said parts, the female part being provided with an outwardly flaring annular groove, and the male part with a grooved annular flange of beveled or tapering cross section, fitting into said groove and adapted to yieldingly enter the latter under the pressure of the clamping means, said beveled flange being made slightly sharper than the flaring groove so as to engage the sides of the latter only at its corners, substantially as described.

4. A pipe fitting, consisting of opposed male and female parts, and clamping means between said parts, the female part being provided with an annular groove and the male part with a grooved annular flange fitting within said groove and adapted to yieldingly enter the latter under the pressure of the clamping means, the outer corners only of the annular flange engaging the beveled walls of the groove and a fluid substance introduced into the joint to exert hydraulic pressure upon the grooved flange tending to expand the latter against the groove when the clamping means is tightened, substantially as described.

5. An improved pipe fitting, consisting of male and female parts, and clamping means between said parts, the female part being provided with an outwardly flaring annular groove, and the male part with a grooved annular flange of beveled or tapering cross section fitting into said groove and adapted to yieldingly enter the latter under the pressure of the clamping means, said beveled flange being made slightly sharper than the flaring groove so as to engage the sides of the latter only at its corners, and a fluid substance introduced into the joint to exert hydraulic pressure upon the grooved flange tending to expand the latter against the groove when the clamping means is tightened, substantially as described.

6. In a coupling for pipes etc., a pair of coupling members and means for drawing them tightly together, said members being provided with interfitting annular rings or flanges on their adjacent faces whose lines of contact are annular, one at least of said annular flanges being radially elastic, and this elastic flange having contact only at its outer corner for the purpose set forth.

7. In a coupling for pipes etc., the combination of a pair of metallic coupling members and means for drawing them tightly together, one of said members being provided with an annular groove in its face said groove having outwardly flaring walls, and the other member being provided with a pair of annular flanges on its face which extend into said groove and whose outer edges or corners only bear on the flaring walls of said groove, one at least of said flanges being radially elastic.

8. In a pipe coupling, an entering member having an elastic tapered end portion in combination with a receiving member having a tapered socket, the taper of the socket being at a different angle from the taper of said end portion.

9. In a pipe coupling, an entering member having an elastic end portion, and a receiving member having a tapered socket, the socket contacting with the end portion only at the extremity of the latter.

In testimony, that I claim the foregoing as my invention, I affix my signature in presence of two subscribing witnesses, this 14th day of August, A. D. 1905.

GEO. CLARK.

Witnesses:
HENRY W. CARTER,
K. A. COSTELLO.